(12) United States Patent
Al-Blaies et al.

(10) Patent No.: US 12,742,547 B2
(45) Date of Patent: Sep. 22, 2026

(54) PYROLYSIS OF WASTE FLARE GAS FOR POWER GENERATION

(71) Applicant: Saudi Arabian Oil Company, Dhahran (SA)

(72) Inventors: Wael F. Al-Blaies, Dhahran (SA); Ayidh A. Al-Qahtani, Dammam (SA); Mohammed A. Al-Mahmood, Dhahran (SA); Fawaz Al-Warthan, Dhahran (SA); Abdullmajeed I. Al Sanad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 362 days.

(21) Appl. No.: 18/483,961

(22) Filed: Oct. 10, 2023

(65) Prior Publication Data

US 2025/0116400 A1 Apr. 10, 2025

(51) Int. Cl.
*F23G 7/06* (2006.01)
*C01B 3/24* (2006.01)

(52) U.S. Cl.
CPC ................ *F23G 7/065* (2013.01); *C01B 3/24* (2013.01); *F23G 7/063* (2013.01); (Continued)

(58) Field of Classification Search
CPC .... F23G 7/065; F23G 7/063; F23G 2201/303; F23G 2203/10; F23G 2203/203;
(Continued)

(56) References Cited

U.S. PATENT DOCUMENTS

| | | | | |
|---|---|---|---|---|
| 6,908,297 | B2 | 6/2005 | Dafft et al. | |
| 7,871,826 | B2 * | 1/2011 | Peng .................... | G01N 33/225 252/372 |

(Continued)

FOREIGN PATENT DOCUMENTS

| | | |
|---|---|---|
| EP | 3096864 | 11/2016 |
| WO | WO 2022058585 | 3/2022 |

OTHER PUBLICATIONS afrinhewitt.com [online], "Hydrogen as a sustainable solution to gas flaring," Nov. 2, 2022, retrieved on Jul. 24, 2023, retrieved from URL<https://www.afrinhewitt.com/hydrogen-as-a-sustainable-solution-to-gas-flaring/>, 6 pages.

(Continued)

*Primary Examiner* — Avinash A Savani
(74) *Attorney, Agent, or Firm* — Fish & Richardson P.C.

(57) ABSTRACT

A portion of a flare gas flowing in a flare header of a gas processing plant is flowed through a methane pipe branching from the flare header to a pyrolysis chamber. The flare gas includes methane. The portion of the flare gas is heated within the pyrolysis chamber in the absence of oxygen to thermally decompose the methane into hydrogen and solid carbon. The hydrogen from the pyrolysis chamber is flowed through a hydrogen pipe to a fuel gas header flowing a fuel gas comprising at least one hydrocarbon. The hydrogen and the fuel gas mix within the fuel gas header to form a fuel mixture. The fuel mixture is combusted to generate electrical power. At least a portion of the generated electrical power is provided to the pyrolysis chamber to heat the portion of the flare gas.

19 Claims, 4 Drawing Sheets

(52) U.S. Cl.
CPC ................ *C01B 2203/0272* (2013.01); *C01B 2203/1241* (2013.01); *F23G 2201/303* (2013.01); *F23G 2206/10* (2013.01); *F23G 2206/203* (2013.01); *F23G 2209/14* (2013.01)

(58) Field of Classification Search
CPC ............. C01B 3/24; C01B 2203/0272; C01B 2203/1241; G23G 2209/14
USPC .............................................................. 431/5
See application file for complete search history.

(56) References Cited

U.S. PATENT DOCUMENTS

2005/0032920 A1* 2/2005 Norbeck .................... C10J 3/00 422/600
2009/0156695 A1* 6/2009 Young ........................ C10J 3/00 252/373
2021/0047180 A1* 2/2021 Hart .......................... C01B 3/26

OTHER PUBLICATIONS

Fau et al., "Methane Pyrolysis: literature survey and comparisons of available data for use in numerical simulations," 49th AIAA/ASME/SAE/ASEE Joint Propulsion Conference, Jul. 2013 in San Jose, CA, United States, submitted Oct. 1, 2013, 38 pages.
Patlolla et al., "A review of methane pyrolysis technologies for hydrogen production," Renewable and Sustainable Energy Reviews, Jul. 2023, 181, 113323, 12 pages.
Sanchez-Bastardo et al., "Methane Pyrolysis for Zero-Emission Hydrogen Production: A Potential Bridge Technology from Fossil Fuels to a Renewable and Sustainable Hydrogen Economy," Ind. Eng. Chem. Res., Aug. 2021, 60:11855-11881, 27 pages.

* cited by examiner

PYROLYSIS OF WASTE FLARE GAS FOR POWER GENERATION

TECHNICAL FIELD

This disclosure relates to pyrolysis of waste flare gas for generating power.

BACKGROUND

A gas flare is a gas combustion device. Gas flares can be used for burning off flammable gas, either as a way to dispose of the gas or as a safety measure to relieve pressure during planned or unplanned over-pressuring of equipment. Gas flares can be installed on many places, such as onshore and offshore platforms, production fields, transport ships, port facilities, storage tank farms, and along distribution pipelines.

SUMMARY

This disclosure describes technologies relating to integration of pyrolysis of waste methane from a gas processing flare header and power generation. Certain aspects of the subject matter described can be implemented as a method. A portion of a flare gas flowing in a flare header of a gas processing plant is flowed through a methane pipe branching from the flare header to a pyrolysis chamber. The flare gas includes methane. The portion of the flare gas is heated within the pyrolysis chamber in the absence of oxygen to thermally decompose the methane into hydrogen and solid carbon. The hydrogen from the pyrolysis chamber is flowed through a hydrogen pipe to a fuel gas header flowing a fuel gas comprising at least one hydrocarbon. The hydrogen and the fuel gas mix within the fuel gas header to form a fuel mixture. The fuel mixture is combusted to generate electrical power. At least a portion of the generated electrical power is provided to the pyrolysis chamber to heat the portion of the flare gas.

This, and other aspects, can include one or more of the following features. In some implementations, a heating value of the fuel mixture in the fuel gas header is measured to determine whether the measured heating value of the fuel mixture in the fuel gas header is within a specified heating value range. In some implementations, the flow of hydrogen through the hydrogen pipe to the fuel gas header is adjusted in response to determining that the measured heating value of the fuel mixture in the fuel gas header is outside the specified heating value range. In some implementations, adjusting the flow of hydrogen through the hydrogen pipe to the fuel gas header includes adjusting the flow of the portion of the flare gas flowing through the methane pipe to the pyrolysis chamber. In some implementations, the specified heating value range is about 900 British thermal units per standard cubic feet (Btu/scf) to about 1,050 Btu/scf. In some implementations, a flow rate of the flare gas flowing in the flare header is measured. In some implementations, the flow of the portion of the flare gas flowing through the methane pipe to the pyrolysis chamber is adjusted based on the measured flow rate of the flare gas flowing in the flare header.

Certain aspects of the subject matter described can be implemented as a system. The system includes a flare header of a gas processing plant, a methane pipe, a pyrolysis chamber, a hydrogen pipe, and a fuel gas header. The flare header is configured to flow flare gas to a flare. The flare gas includes methane. The methane pipe branches from the flare header and connects to the pyrolysis chamber. The methane pipe is configured to route a portion of the flare gas from the flare header to the pyrolysis chamber. The pyrolysis chamber is configured to heat the portion of the flare gas routed by the methane pipe in the absence of oxygen to thermally decompose the methane into hydrogen and solid carbon. The hydrogen pipe is connected to the pyrolysis chamber and the fuel gas header. The hydrogen pipe is configured to flow the hydrogen from the pyrolysis chamber to the fuel gas header. The fuel gas header is connected to a power generation plant. The fuel gas header is configured to flow a mixture of the hydrogen and fuel gas comprising at least one hydrocarbon to the power generation plant where the mixture is combusted to generate electrical power. The pyrolysis chamber is electrically connected to the power generation plant. The pyrolysis chamber is configured to receive electrical power from the power generation plant and convert the received electrical power into heat for heating the portion of the flare gas.

This, and other aspects, can include one or more of the following features. In some implementations, the system includes an online heating value sensor disposed on the fuel gas header. The online heating value sensor can be configured to measure a heating value of the mixture in the fuel gas header. In some implementations, the system includes a controller communicatively coupled to the online heating value sensor. The online heating value sensor can be configured to transmit the measured heating value of the mixture in the fuel gas header to the controller. The controller can be configured to determine whether the measured heating value received from the online heating value sensor is within a specified heating value range. In some implementations, the system includes a hydrogen flow control valve disposed on the hydrogen pipe. The hydrogen flow control valve can be communicatively coupled to the controller. The controller can be configured to transmit a hydrogen adjust opening signal to the hydrogen flow control valve to adjust a percent opening of the hydrogen flow control valve in response to determining that the measured heating value of the mixture in the fuel gas header is outside the specified heating value range. In some implementations, the specified heating value range is about 900 British thermal units per standard cubic feet (Btu/scf) to about 1,050 Btu/scf. In some implementations, the system includes a flow sensor disposed on the flare header. The flow sensor can be configured to measure a flow rate of the flare gas flowing in the flare header. In some implementations, the controller is communicatively coupled to the flow sensor. The flow sensor can be configured to transmit the measured flow rate of the flare gas flowing in the flare header to the controller. In some implementations, the system includes a methane flow control valve disposed on the methane pipe. The methane flow control valve can be communicatively coupled to the controller. The controller can be configured to transmit a methane adjust opening signal to the methane flow control valve to adjust a percent opening of the methane flow control valve at least based on the measured flow rate of the flare gas flowing in the flare header received from the flow sensor.

Certain aspects of the subject matter described can be implemented as a method. A fuel gas including at least one hydrocarbon is combusted. Electrical power is generated in response to combusting the fuel gas. A first portion of the generated electrical power is provided to a gas processing plant. A second portion of the generated electrical power is provided to a pyrolysis chamber. The second portion of the generated electrical power is converted to heat within the pyrolysis chamber. A portion of a flare gas from the gas processing plant is flowed to the pyrolysis chamber. The flare gas includes methane. The portion of the flare gas is heated with the heat within the pyrolysis chamber in the absence of oxygen to thermally decompose the methane into hydrogen and solid carbon. The hydrogen from the pyrolysis chamber is mixed with the fuel gas to form a fuel gas mixture prior to combustion of the fuel gas. Combusting the fuel gas includes combusting the fuel mixture.

This, and other aspects, can include one or more of the following features. In some implementations, the method includes measuring a heating value of the fuel gas mixture to determine whether the measured heating value of the fuel gas mixture is within a specified heating value range. In some implementations, the method includes adjusting an amount of hydrogen being mixed with the fuel gas in response to determining that the measured heating value of the fuel gas mixture is outside the specified heating value range. In some implementations, the specified heating value range is about 900 British thermal units per standard cubic feet (Btu/scf) to about 1,050 Btu/scf.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes methane pyrolysis integrated with gas processing. Instead of sending waste gas to the flare of a gas processing facility, the waste gas is flowed to a pyrolysis unit in which the methane is cracked to produce hydrogen gas and solid carbon. The produced hydrogen can be mixed with fuel gas to reduce fuel gas consumption in power/steam generation. Excess hydrogen can be stored and/or utilized. Excess power from the facility will be utilized to perform the methane pyrolysis. The proposed methods and systems can reduce the load to the flare, produce carbon and graphene as a useful by-product, reduce greenhouse gas emissions, and result in operating cost savings.

The subject matter described in this disclosure can be implemented in particular implementations, so as to realize one or more of the following advantages. Flare gas, which is typically simply burned and released into the atmosphere as emissions, can be instead used to generate hydrogen via pyrolysis. Routine flaring can, therefore, be reduced in gas processing facilities and other facilities that regularly flow waste gas to flares. By re-routing flare gas to a pyrolysis chamber, the described systems and methods reduce greenhouse gas emissions. The generated hydrogen can be mixed with fuel gas which is burned in a power generation plant to produce steam and electrical power. The hydrogen generated from pyrolysis of the flare gas not only facilitates generation of steam and power, but also reduces fuel gas consumption, which contributes to decarbonization efforts and reduces costs related to fuel gas consumption. The power generated can also be used to operate the pyrolysis chamber, which can result in operational cost savings. In cases where excess hydrogen is generated, the excess hydrogen can be stored and/or transported to other facilities (such as other power generation plants). In some cases, the excess hydrogen can be mixed with other recoverable gases that may also be used as a flare gas. The pyrolysis of the flare gas also generates solid carbon, which can be converted into useful and valuable carbon products.

Figure 1:
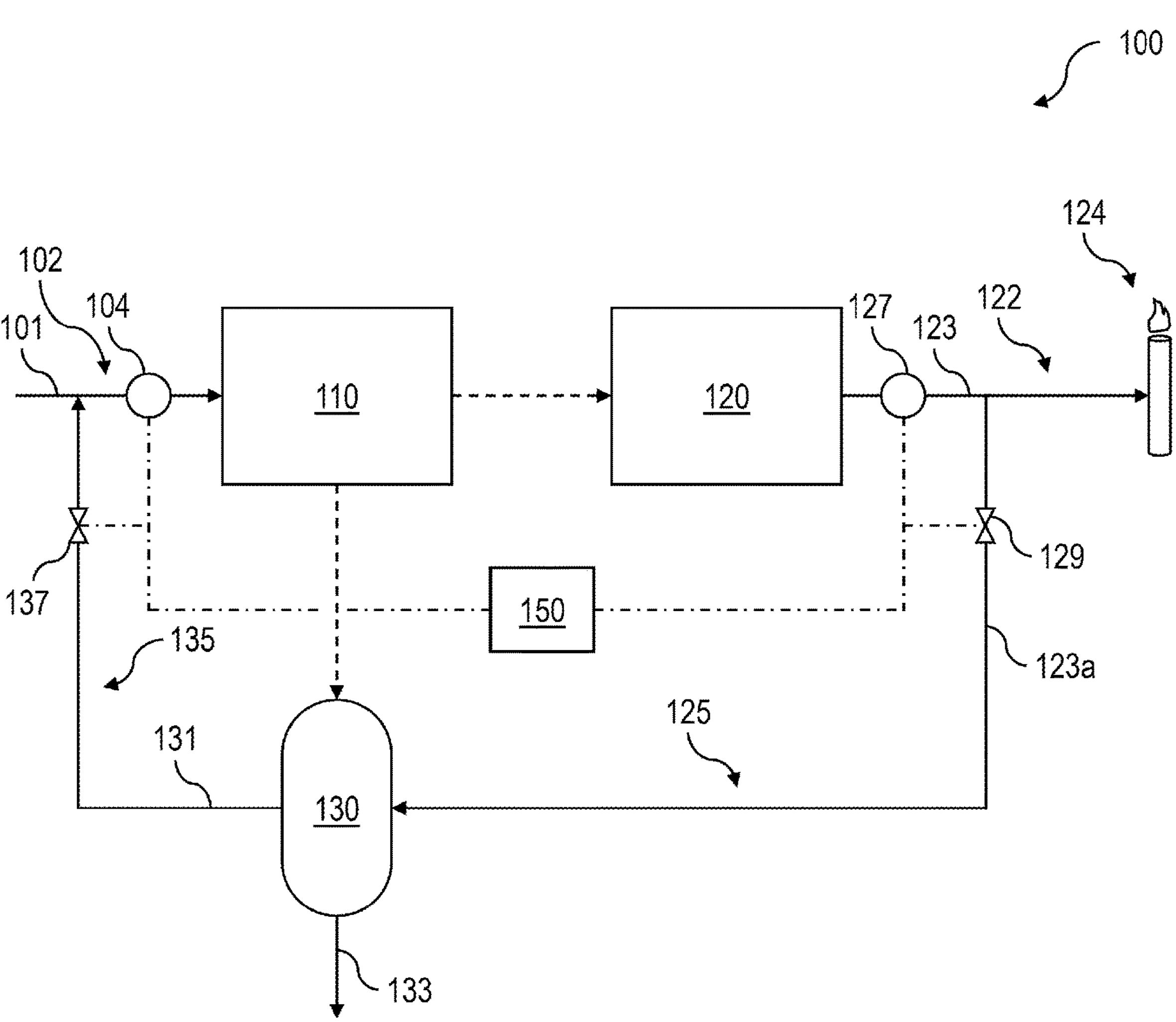
FIG. 1 is a schematic diagram of an example system for integrating pyrolysis of waste methane from a gas processing flare header and power generation.

FIG. 1 depicts a system 100 for integrating pyrolysis of waste methane from a gas processing flare header and power generation. The pyrolysis of methane produces hydrogen which can be mixed with fuel gas to reduce fuel gas consumption in power/steam generation. The system 100 includes a power generation plant 110 and a gas processing plant 120. The system 100 includes a fuel gas header 102 that flows a fuel gas 101 to the power generation plant 110. The power generation plant 110 is configured to combust the fuel gas 101 to generate steam and electrical power. The fuel gas 101 includes at least one hydrocarbon. For example, the fuel gas 101 can include hydrocarbons having a carbon number from 1 to 3, such as methane, ethane, and propane. The power generation plant 110 burns the fuel gas 101 (for example, in a furnace), and the heat from combustion of the fuel gas 101 can be used to generate steam (for example, boil water). At least a portion of the generated steam can be used to generate electrical power. For example, at least a portion of the generated steam can flow through a turbine-generator. The turbine-generator can include turbine blades connected to a rotor. As the steam flows through the turbine-generator, the turbine blades rotate along with the rotor. As the rotor of the turbine-generator rotates, electrical power is produced.

The gas processing plant 120 is configured to process a hydrocarbon gas, such as natural gas produced from a well formed in a subterranean formation. For example, the gas processing plant 120 processes natural gas to remove contaminants, such as solids, water, carbon dioxide, hydrogen sulfide, mercury, and/or higher molecular mass hydrocarbons (condensate) to produce pipeline quality dry natural gas for distribution and use. The gas processing plant 120 can receive power, for example, from a power grid, from the power generation plant 110, or both to perform its gas processing operations. In some implementations, power is also generated within the gas processing plant 120 for performing gas processing operations. The gas processing plant 120 includes a flare header 122 that routes gas 123 to a flare 124. During natural gas processing, the lightest portions of the natural gas (such as methane) are routed through the flare header 122 to the flare 124 to be burned so that release of flammable gas into the atmosphere is avoided. In many cases, the use of a flare is a necessary safety precaution to prevent uncontrolled release of fluid in a facility. However, flaring is inherently wasteful in that it burns gas that could be potentially used for productive purposes, such as generating power. For example, the flare gas 123 typically includes methane, which can be used productively instead of simply being burned at the flare 124.

The system 100 includes a pyrolysis chamber 130 that is connected to the flare header 122 by a methane pipe 125. The methane pipe 125 is configured to route at least a portion **123*a* of the flare gas 123 flowing in the flare header 122 to the pyrolysis chamber 130 instead of to the flare 124. The system 100 allows a portion of the flare gas 123 that would otherwise simply be burned by the flare 124 to be used in a productive manner. The portion 123***a* of the flare gas 123 flows through the methane pipe 125 to the pyrolysis chamber 130 and is pyrolyzed (that is, heated in an inert environment). Because the flare gas 123 typically includes methane, pyrolysis of the portion 123*a* of the flare gas 123 in the pyrolysis chamber 130 can produce hydrogen 131 and solid carbon 133. The solid carbon 133 can, for example, be processed to produce useful and valuable carbon products, such as carbon black, char, synthetic graphite, carbon filament/fiber, and carbon nanostructures (such as carbon nanotubes or carbon nanofibers).

In some implementations, the pyrolysis chamber 130 operates at a pyrolysis temperature in a range of from about 1,200 degrees Celsius (° C.) to about 1,500° C. The pyrolysis chamber 130 can be heated to the pyrolysis temperature, for example, by an electric heater that converts electricity into heat. The pyrolysis chamber 130 can receive power, for example, from the power generation plant 110 and convert the received power into heat to provide the pyrolysis temperature within the pyrolysis chamber 130.

The system 100 includes a hydrogen pipe 135 connecting the pyrolysis chamber 130 to the fuel gas header 102. Hydrogen 131 from the pyrolysis chamber 130 flows through the hydrogen pipe 135 to the fuel gas header 102. In the fuel gas header 102, the hydrogen 131 mixes with the fuel gas 101 and is flowed to the power generation plant 110. The hydrogen 131 mixed with the fuel gas 101 is burned in the power generation plant 110 to generate power. By flowing the hydrogen 131 produced from pyrolysis of the portion 123*a* of the flare gas 123 in the pyrolysis chamber 130 to the fuel gas header 102, at least a portion of the flare gas 123 (the portion 123*a*) is used productively to generate power in the power generation plant 110 instead of simply being burned at the flare 124.

In some implementations, the system 100 includes an online heating value sensor 104 disposed on the fuel gas header 102. The online heating value sensor 104 is configured to measure a heating value of the mixture of the hydrogen 131 and the fuel gas 101 flowing in the fuel gas header 102. It can be beneficial to maintain a minimum specified heating value of the gas flowing to the power generation plant 110 to ensure smooth and reliable power generation in the power generation plant 110. For example, if the heating value of the gas flowing to the power generation plant 110 is below the minimum specified heating value, then there can be a risk of combustion ceasing to occur, which in turn ceases generation of steam and power in the power generation plant 110. In some implementations, the minimum specified heating value is in a range of from about 900 British thermal units per standard cubic feet (Btu/scf) to about 1,000 Btu/scf.

In some implementations, the system 100 includes a controller 150 that is communicatively coupled to the online heating value sensor 104. The online heating value sensor 104 can be configured to transmit the measured heating value of the mixture of the hydrogen 131 and the fuel gas 101 flowing in the fuel gas header 102 to the controller 150. The controller 150 can be configured to determine whether the measured heating value received from the online heating value sensor 104 is within a specified heating value range. In some implementations, the specified heating value range is about 900 Btu/scf to about 1,050 Btu/scf.

In some implementations, the system 100 includes a hydrogen flow control valve 137 disposed on the hydrogen pipe 135. The hydrogen flow control valve 137 can control the flow of hydrogen 131 through the hydrogen pipe 135. The hydrogen flow control valve 137 can be communicatively coupled to the controller 150. If the controller 150 determines that the measured heating value received from the online heating value sensor 104 is outside the specified heating value range (for example, less than about 900 Btu/scf or more than about 1,050 Btu/scf), then the controller 150 can transmit a hydrogen adjust opening signal to the hydrogen flow control valve 137 to adjust a percent opening of the hydrogen flow control valve 137. For example, if the controller 150 determines that the measured heating value received from the online heating value sensor 104 is over the specified heating value range (for example, more than about 1,050 Btu/scf), then the controller 150 can transmit a signal to the hydrogen flow control valve 137 that causes the hydrogen flow control valve 137 to increase its percent opening to allow more hydrogen 131 to flow through the hydrogen pipe 135 to the fuel gas header 102. As another example, if the controller 150 determines that the measured heating value received from the online heating value sensor 104 is below the specified heating value range (for example, less than about 900 Btu/scf), then the controller 150 can transmit a signal to the hydrogen flow control valve 137 that causes the hydrogen flow control valve 137 to decrease its percent opening to allow less hydrogen 131 to flow through the hydrogen pipe 135 to the fuel gas header 102.

In some implementations, the system 100 includes a flow sensor 127 disposed on the flare header 122. The flow sensor 127 is configured to measure a flow rate of the flare gas 123 flowing in the flare header 122. Because the flow rate of the flare gas 123 flowing in the flare header 122 can fluctuate (and in some cases, abruptly, for example, during pressure relief scenarios), it can be beneficial to monitor the flow rate of the flare gas 123 flowing in the flare header 122. Fluctuations in the flow rate of the flare gas 123 flowing in the flare header 122 can also affect the flow of the portion 123*a* of the flare gas 123 flowing through the methane pipe 125, which can, in turn, affect the pyrolysis operation of the pyrolysis chamber 130. The flow sensor 127 can be communicatively coupled to the controller 150. The flow sensor 127 can be configured to transmit the measured flow rate of the flare gas 123 flowing in the flare header 122 to the controller 150. In some implementations, the flow sensor 127 can alternatively be disposed on the methane pipe 125 (or an additional flow sensor can be disposed on the methane pipe 125) for measuring the flow rate of the portion 123*a* of the flare gas 123 flowing in the methane pipe 125 to the pyrolysis chamber 130.

In some implementations, the system 100 includes a methane flow control valve 129 disposed on the methane pipe 125. The methane flow control valve 129 can control the flow of the portion 123*a* of the flare gas 123 through the methane pipe 125. The methane flow control valve 129 can be communicatively coupled to the controller 150. The controller 150 can transmit a methane adjust opening signal to the methane flow control valve 129 to adjust a percent opening of the methane flow control valve 129 based on the measured flow rate of the flare gas 123 flowing in the flare header 122 (and/or the portion 123*a* of the flare gas 123 flowing in the methane pipe 125) received from the flow sensor 127. For example, if the controller 150 determines that the measured flow rate of the flare gas 123 flowing in the flare header 122 (and/or the portion 123*a* of the flare gas 123 flowing in the methane pipe 125) received from the flow sensor 127 has increased by at least about 10% within an interval of about 2 minutes, then the controller 150 can transmit a signal to the methane flow control valve 129 that causes the methane flow control valve 129 to decrease its percent opening to allow less of the flare gas 123 to flow through the methane pipe 125 to the pyrolysis chamber 130. As another example, if the controller 150 determines that the measured flow rate of the flare gas 123 flowing in the flare header 122 (and/or the portion 123*a* of the flare gas 123 flowing in the methane pipe 125) received from the flow sensor 127 has increased by at least about 10%-20% within an interval of about 2-3 minutes, then the controller 150 can transmit a signal to the methane flow control valve 129 that causes the methane flow control valve 129 to decrease its percent opening to allow less of the flare gas 123 to flow through the methane pipe 125 to the pyrolysis chamber 130.

Figure 2:
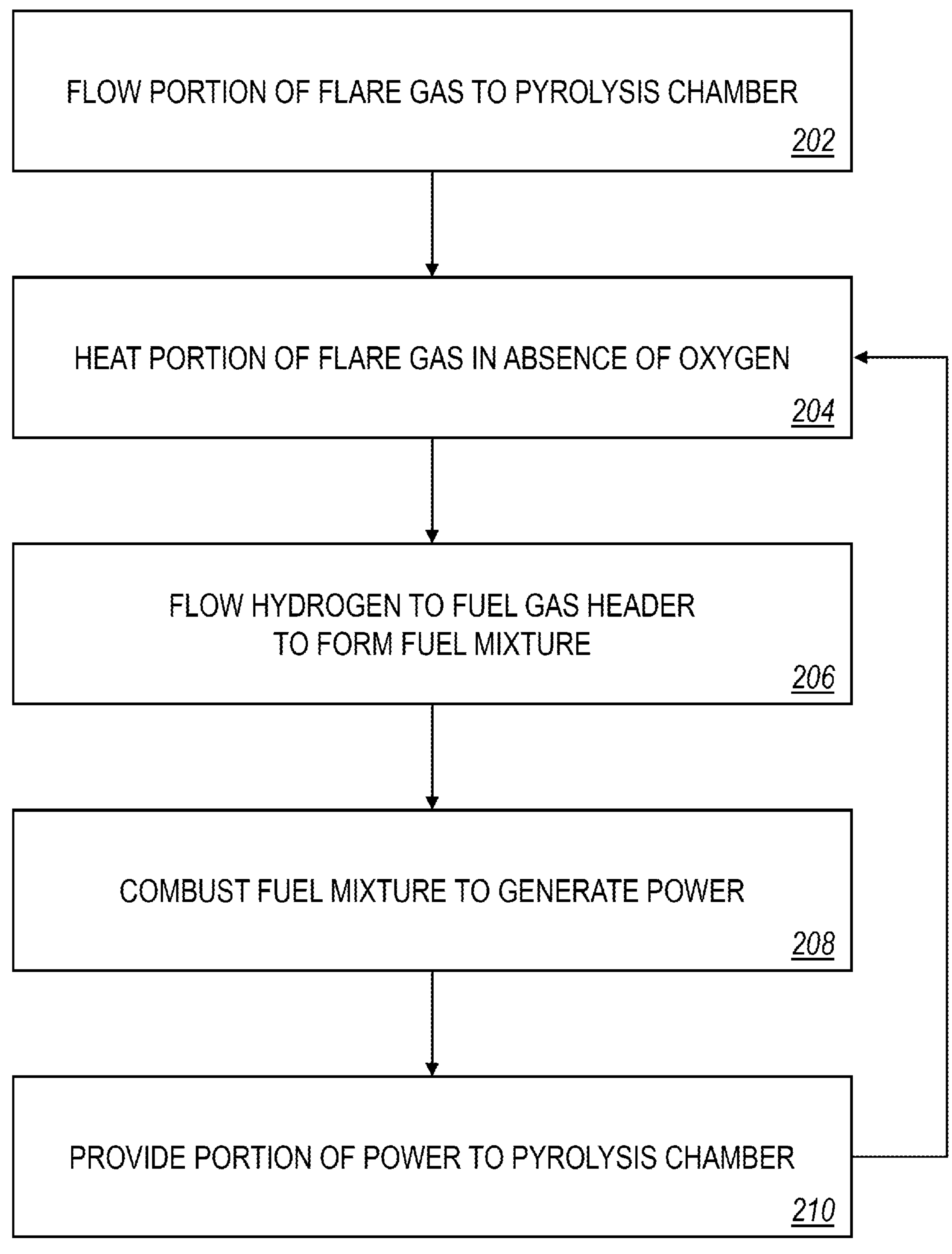
FIG. 2 is a flow chart of an example method for integrating pyrolysis of waste methane from a gas processing flare header and power generation.

FIG. 2 is a flow chart of a method 200 for integrating pyrolysis of waste methane from a gas processing flare header and power generation. The system 100 can, for example, implement method 200. At block 202, a portion (such as the portion 123*a*) of a flare gas (such as the flare gas 123) flowing in a flare header (such as the flare header 122) of a gas processing plant (such as the gas processing plant 120) is flowed through a methane pipe (such as the methane pipe 125) that branches from the flare header 122 to a pyrolysis chamber (such as the pyrolysis chamber 130). The flare gas 122 includes methane. At block 204, the portion 123*a* of the flare gas 123 is heated within the pyrolysis chamber 130 in the absence of oxygen to thermally decompose the methane into hydrogen (such as the hydrogen 131) and solid carbon (such as the solid carbon 133). At block 206, the hydrogen 131 is flowed from the pyrolysis chamber 130 through a hydrogen pipe (such as the hydrogen pipe 135) to a fuel gas header (such as the fuel gas header 102) that flows a fuel gas (such as the fuel gas 101). The fuel gas 101 includes at least one hydrocarbon. The hydrogen 131 and the fuel gas 101 mix within the fuel gas header 102 to form a fuel mixture. At block 208, the fuel mixture (mixture of hydrogen 131 and fuel gas 101) is combusted to generate electrical power. For example, the fuel mixture is combusted in the power generation plant 110 at block 208, and the heat from combustion of the fuel mixture is used to generate steam which flows through a turbine-generator to produce electrical power. At block 210, at least a portion of the electrical power generated at block 208 is provided to the pyrolysis chamber 130 to heat the portion 123*a* of the flare gas 123 (block 204). For example, the power can be provided from the power generation plant 110 to the pyrolysis chamber 130, which converts the provided power into heat to heat the portion 123*a* of the flare gas 123.

Figure 3:
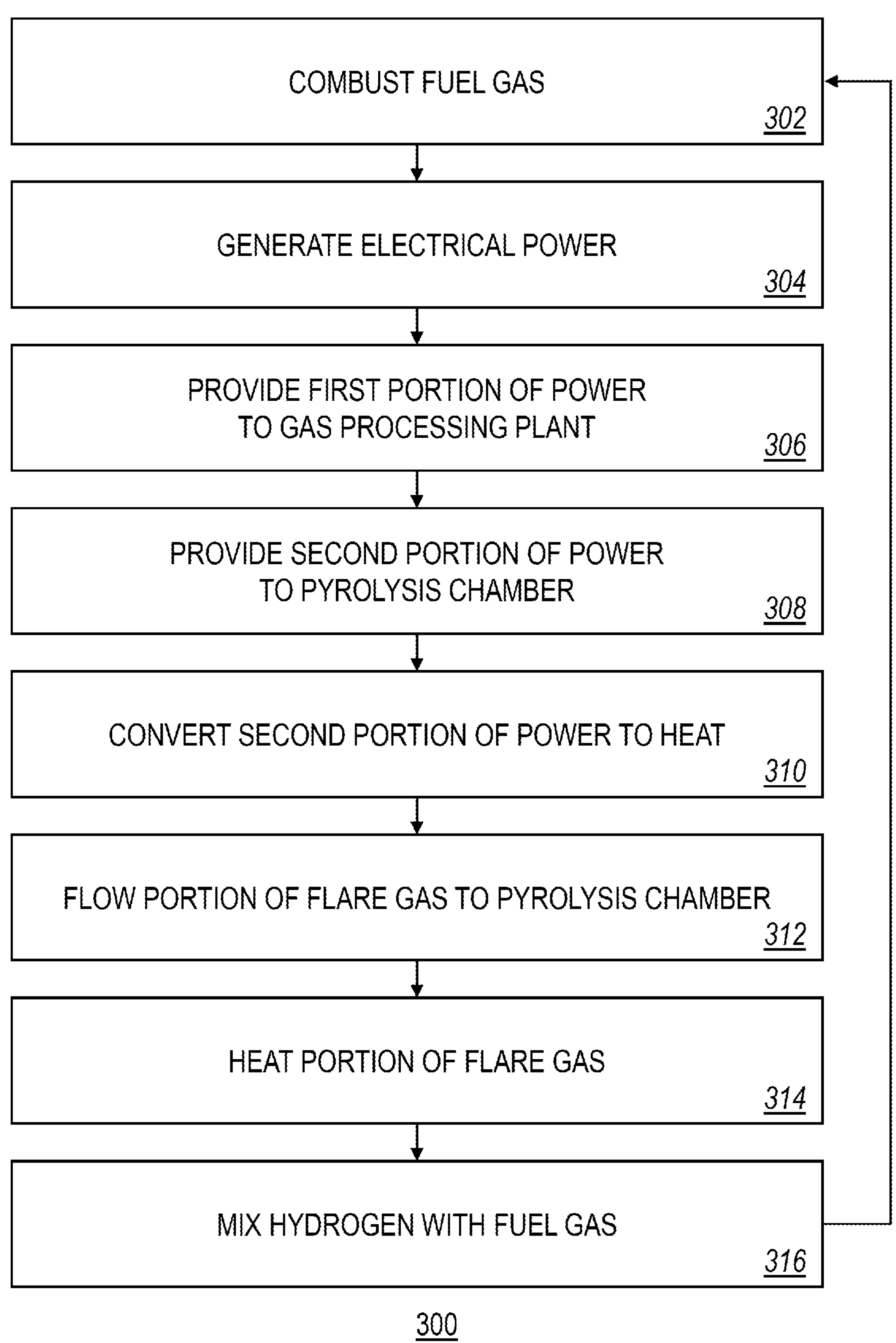
FIG. 3 is a flow chart of an example method for integrating pyrolysis of waste methane from a gas processing flare header and power generation.

FIG. 3 is a flow chart of a method 300 for integrating pyrolysis of waste methane from a gas processing flare header and power generation. The system 100 can, for example, implement method 300. At block 302, a fuel gas (such as the fuel gas 101) is combusted. The fuel gas 101 includes at least one hydrocarbon. The fuel gas 101 can be combusted at block 302, for example, in the power generation plant 110. At block 304, electrical power is generated in response to combusting the fuel gas 101 at block 302. Electrical power can be generated at block 304, for example, in the power generation plant 110. For example, the heat from combustion of the fuel gas 101 (block 302) is used to generate steam which flows through a turbine-generator to produce electrical power at block 304. At block 306, a first portion of the generated electrical power is provided to a gas processing plant (such as the gas processing plant 120). The gas processing plant 120 can, for example, use the first portion of the electrical power provided at block 306 to perform gas processing operations. At block 308, a second portion of the generated electrical power is provided to a pyrolysis chamber (such as the pyrolysis chamber 130). At block 310, the second portion of the generated electrical power (provided at block 308) is converted to heat within the pyrolysis chamber 130. At block 312, a portion (such as the portion 123*a*) of a flare gas (such as the flare gas 123) is flowed from the gas processing plant 120 to the pyrolysis chamber 130. The flare gas 123 includes methane. At block 314, the portion 123*a* of the flare gas 123 is heated (with the heat generated at block 310) within the pyrolysis chamber 130 in the absence of oxygen to thermally decompose the methane into hydrogen (such as the hydrogen 131) and solid carbon (such as the solid carbon 133). At block 316, the hydrogen 131 from the pyrolysis chamber 130 is mixed with the fuel gas 101 to form a fuel gas mixture prior to combustion of the fuel gas 101 (block 302). Combusting the fuel gas 101 at block 302 can include combusting the fuel gas mixture that is formed at block 316.

Figure 4:
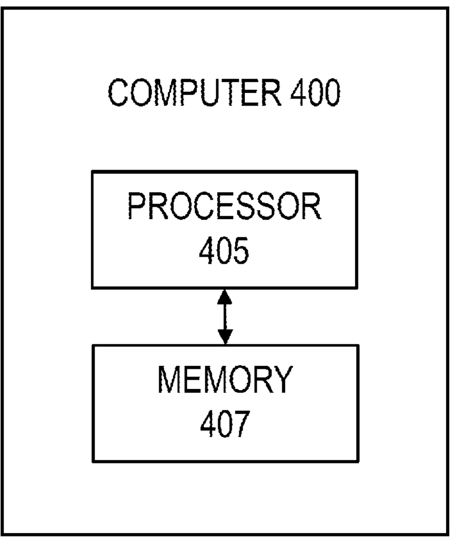
FIG. 4 is a block diagram of an example computer system.

FIG. 4 is a block diagram of an example computer 400 used to provide computational functionalities associated with described algorithms, methods, functions, processes, flows, and procedures, as described in this specification, according to an implementation. The controller 150 (shown in FIG. 1) can, for example, be an implementation of the computer 400. The illustrated computer 400 is intended to encompass any computing device such as a server, desktop computer, laptop/notebook computer, one or more processors within these devices, or any other processing device, including physical or virtual instances (or both) of the computing device. Additionally, the computer 400 can include a computer that includes an input device, such as a keypad, keyboard, touch screen, or other device that can accept user information, and an output device that conveys information associated with the operation of the computer 400, including digital data, visual, audio information, or a combination of information.

The computer 400 includes a processor 405. The processor 405 may be a microprocessor, a multi-core processor, a multithreaded processor, an ultra-low-voltage processor, an embedded processor, or a virtual processor. In some embodiments, the processor 405 may be part of a system-on-a-chip (SoC) in which the processor 405 and the other components of the computer 400 are formed into a single integrated electronics package. In some implementations, the processor 405 may include processors from Intel® Corporation of Santa Clara, California, from Advanced Micro Devices, Inc. (AMD) of Sunnyvale, California, or from ARM Holdings, LTD., Of Cambridge, England. Any number of other processors from other suppliers may also be used. Although illustrated as a single processor 405 in FIG. 4, two or more processors may be used according to particular needs, desires, or particular implementations of the computer 400. Generally, the processor 405 executes instructions and manipulates data to perform the operations of the computer 400 and any algorithms, methods, functions, processes, flows, and procedures as described in this specification.

The computer 400 also includes a memory 407 that can hold data for the computer 400 or other components (or a combination of both) that can be connected to the network. Although illustrated as a single memory 407 in FIG. 4, two or more memories 407 (of the same or combination of types) can be used according to particular needs, desires, or particular implementations of the computer 400 and the described functionality. While memory 407 is illustrated as an integral component of the computer 400, memory 407 can be external to the computer 400. The memory 407 can be a transitory or non-transitory storage medium. In some implementations, such as in PLCs and other process control units, the memory 407 is integrated with the database 406 used for long-term storage of programs and data. The memory 407 can include any number of volatile and non-volatile memory devices, such as volatile random-access memory (RAM), static random-access memory (SRAM), flash memory, and the like. In smaller devices, such as PLCs, the memory 407 may include registers associated with the processor 405 itself.

The memory 407 stores computer-readable instructions executable by the processor 405 that, when executed, cause the processor 405 to perform operations, such as determining whether the measured heating value received from the online heating value sensor 104 is within the specified heating value range, transmitting a signal to the hydrogen flow control valve 137 to adjust a percent opening of the hydrogen flow control valve 137, and transmitting a signal to the methane flow control valve 129 to adjust a percent opening of the methane flow control valve 129. The computer 400 can also include a power supply 414. The power supply 414 can include a rechargeable or non-rechargeable battery that can be configured to be either user- or non-user-replaceable. The power supply 414 can be hard-wired. There may be any number of computers 400 associated with, or external to, a computer system containing computer 400, each computer 400 communicating over the network. Further, the term "client," "user," "operator," and other appropriate terminology may be used interchangeably, as appropriate, without departing from this specification. Moreover, this specification contemplates that many users may use one computer 400, or that one user may use multiple computers 400.

The computational operations can be implemented using one or more databases, which store data received from the physical world operations and/or generated internally within the computational operations (e.g., by implementing the methods of the present disclosure) or both. For example, the one or more computers 400 process inputs from the physical world operations to assess conditions in the physical world, the outputs of which are stored in the databases. The source and received signals are provided to the computational operations where they are stored in the databases and analyzed by the one or more computers 400.

In some implementations, one or more outputs generated by the one or more computers 400 can be provided as feedback/input to the physical world operations (either as direct input or stored in the databases). The physical world operations can use the feedback/input to control physical components used to perform the physical world operations in the real world, such as adjusting the percent opening of a valve or adjusting a speed of a pump.

In some implementations of the computational operations, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility. The presented information can include feedback, such as changes in parameters or processing inputs, that the user can select to improve an operation environment, such as in the testing or operation of petrochemical processes or facilities. For example, the feedback can include parameters that, when selected by the user, can cause a change to, or an improvement in, operating parameters (such as flow control in the system 100). The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by equipment such as sensors, pumps, heaters, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas processing. For example, outputs of the present disclosure can be used as inputs to other equipment and/or systems at a facility. This can be especially useful for systems or various pieces of equipment that are located several meters or several miles apart, or are located in different countries or other jurisdictions.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

EMBODIMENTS

In an example implementation (or aspect), a method comprises: flowing a portion of a flare gas flowing in a flare header of a gas processing plant through a methane pipe branching from the flare header to a pyrolysis chamber, wherein the flare gas comprises methane; heating, within the pyrolysis chamber, the portion of the flare gas in the absence of oxygen to thermally decompose the methane into hydrogen and solid carbon; flowing the hydrogen from the pyrolysis chamber through a hydrogen pipe to a fuel gas header flowing a fuel gas comprising at least one hydrocarbon, wherein the hydrogen and the fuel gas mix within the fuel gas header to form a fuel mixture; combusting the fuel mixture to generate electrical power; and providing at least a portion of the generated electrical power to the pyrolysis chamber to heat the portion of the flare gas.

In an example implementation (or aspect) combinable with any other example implementation (or aspect), the method comprises measuring a heating value of the fuel mixture in the fuel gas header to determine whether the measured heating value of the fuel mixture in the fuel gas header is within a specified heating value range.

In an example implementation (or aspect) combinable with any other example implementation (or aspect), the method comprises adjusting the flow of hydrogen through the hydrogen pipe to the fuel gas header in response to determining that the measured heating value of the fuel mixture in the fuel gas header is outside the specified heating value range.

In an example implementation (or aspect) combinable with any other example implementation (or aspect), adjusting the flow of hydrogen through the hydrogen pipe to the fuel gas header comprises adjusting the flow of the portion of the flare gas flowing through the methane pipe to the pyrolysis chamber.

In an example implementation (or aspect) combinable with any other example implementation (or aspect), the specified heating value range is about 900 British thermal units per standard cubic feet (Btu/scf) to about 1,050 Btu/scf.

In an example implementation (or aspect) combinable with any other example implementation (or aspect), the method comprises measuring a flow rate of the flare gas flowing in the flare header.

In an example implementation (or aspect) combinable with any other example implementation (or aspect), the method comprises adjusting the flow of the portion of the flare gas flowing through the methane pipe to the pyrolysis chamber based on the measured flow rate of the flare gas flowing in the flare header.

In an example implementation (or aspect), a system comprises: a flare header of a gas processing plant, wherein the flare header is configured to flow flare gas to a flare, wherein the flare gas comprises methane; a methane pipe branching from the flare header and connecting to a pyrolysis chamber, wherein the methane pipe is configured to route a portion of the flare gas from the flare header to the pyrolysis chamber; the pyrolysis chamber, wherein the pyrolysis chamber is configured to heat the portion of the flare gas routed by the methane pipe in the absence of oxygen to thermally decompose the methane into hydrogen and solid carbon; a hydrogen pipe connected to the pyrolysis chamber and a fuel gas header, wherein the hydrogen pipe is configured to flow the hydrogen from the pyrolysis chamber to the fuel gas header; and the fuel gas header connected to a power generation plant, wherein the fuel gas header is configured to flow a mixture of the hydrogen and fuel gas comprising at least one hydrocarbon to the power generation plant where the mixture is combusted to generate electrical power, wherein the pyrolysis chamber is electrically connected to the power generation plant, wherein the pyrolysis chamber is configured to receive electrical power from the power generation plant and convert the received electrical power into heat for heating the portion of the flare gas.

In an example implementation (or aspect) combinable with any other example implementation (or aspect), the system comprises an online heating value sensor disposed on the fuel gas header, wherein the online heating value sensor is configured to measure a heating value of the mixture in the fuel gas header.

In an example implementation (or aspect) combinable with any other example implementation (or aspect), the system comprises a controller communicatively coupled to the online heating value sensor, wherein the online heating value sensor is configured to transmit the measured heating value of the mixture in the fuel gas header to the controller, wherein the controller is configured to determine whether the measured heating value received from the online heating value sensor is within a specified heating value range.

In an example implementation (or aspect) combinable with any other example implementation (or aspect), the system comprises a hydrogen flow control valve disposed on the hydrogen pipe, wherein the hydrogen flow control valve is communicatively coupled to the controller, wherein the controller is configured to transmit a hydrogen adjust opening signal to the hydrogen flow control valve to adjust a percent opening of the hydrogen flow control valve in response to determining that the measured heating value of the mixture in the fuel gas header is outside the specified heating value range.

In an example implementation (or aspect) combinable with any other example implementation (or aspect), the specified heating value range is about 900 British thermal units per standard cubic feet (Btu/scf) to about 1,050 Btu/scf.

In an example implementation (or aspect) combinable with any other example implementation (or aspect), the system comprises a flow sensor disposed on the flare header, wherein the flow sensor is configured to measure a flow rate of the flare gas flowing in the flare header.

In an example implementation (or aspect) combinable with any other example implementation (or aspect), the controller is communicatively coupled to the flow sensor, wherein the flow sensor is configured to transmit the measured flow rate of the flare gas flowing in the flare header to the controller.

In an example implementation (or aspect) combinable with any other example implementation (or aspect), the system comprises a methane flow control valve disposed on the methane pipe, wherein the methane flow control valve is communicatively coupled to the controller, wherein the controller is configured to transmit a methane adjust opening signal to the methane flow control valve to adjust a percent opening of the methane flow control valve at least based on the measured flow rate of the flare gas flowing in the flare header received from the flow sensor.

In an example implementation (or aspect), a method comprises: combusting a fuel gas comprising at least one hydrocarbon; generating electrical power in response to combusting the fuel gas; providing a first portion of the generated electrical power to a gas processing plant; providing a second portion of the generated electrical power to a pyrolysis chamber; converting the second portion of the generated electrical power to heat within the pyrolysis chamber; flowing a portion of a flare gas from the gas processing plant to the pyrolysis chamber, wherein the flare gas comprises methane; heating, with the heat within the pyrolysis chamber, the portion of the flare gas in the absence of oxygen to thermally decompose the methane into hydrogen and solid carbon; and mixing the hydrogen from the pyrolysis chamber with the fuel gas to form a fuel gas mixture prior to combustion of the fuel gas, wherein combusting the fuel gas comprises combusting the fuel mixture.

In an example implementation (or aspect) combinable with any other example implementation (or aspect), the method comprises measuring a heating value of the fuel gas mixture to determine whether the measured heating value of the fuel gas mixture is within a specified heating value range.

In an example implementation (or aspect) combinable with any other example implementation (or aspect), the method comprises adjusting an amount of hydrogen being mixed with the fuel gas in response to determining that the measured heating value of the fuel gas mixture is outside the specified heating value range.

In an example implementation (or aspect) combinable with any other example implementation (or aspect), the specified heating value range is about 900 British thermal units per standard cubic feet (Btu/scf) to about 1,050 Btu/scf.

What is claimed is:

1. A method comprising:

flowing a portion of a flare gas flowing in a flare header of a gas processing plant, wherein the flare header routes gas to a flare, through a methane pipe branching from the flare header to a pyrolysis chamber, wherein the flare gas comprises methane;

heating, within the pyrolysis chamber, the portion of the flare gas in the absence of oxygen to thermally decompose the methane into hydrogen and solid carbon;

flowing the hydrogen from the pyrolysis chamber through a hydrogen pipe to a fuel gas header flowing a fuel gas comprising at least one hydrocarbon, wherein the hydrogen and the fuel gas mix within the fuel gas header to form a fuel mixture;

combusting the fuel mixture to generate electrical power; and providing at least a portion of the generated electrical power to the pyrolysis chamber to heat the portion of the flare gas.

2. The method of claim 1, comprising measuring a heating value of the fuel mixture in the fuel gas header to determine whether the measured heating value of the fuel mixture in the fuel gas header is within a specified heating value range.

3. The method of claim 2, comprising adjusting the flow of hydrogen through the hydrogen pipe to the fuel gas header in response to determining that the measured heating value of the fuel mixture in the fuel gas header is outside the specified heating value range.

4. The method of claim 3, wherein adjusting the flow of hydrogen through the hydrogen pipe to the fuel gas header comprises adjusting the flow of the portion of the flare gas flowing through the methane pipe to the pyrolysis chamber.

5. The method of claim 3, wherein the specified heating value range is about 900 British thermal units per standard cubic feet (Btu/scf) to about 1,050 Btu/scf.

6. The method of claim 3, comprising measuring a flow rate of the flare gas flowing in the flare header.

7. The method of claim 6, comprising adjusting the flow of the portion of the flare gas flowing through the methane pipe to the pyrolysis chamber based on the measured flow rate of the flare gas flowing in the flare header.

8. A system comprising:

a flare header of a gas processing plant, wherein the flare header is configured to flow flare gas to a flare, wherein the flare gas comprises methane;

a methane pipe branching from the flare header and connecting to a pyrolysis chamber, wherein the methane pipe is configured to route a portion of the flare gas from the flare header to the pyrolysis chamber;

the pyrolysis chamber, wherein the pyrolysis chamber is configured to heat the portion of the flare gas routed by the methane pipe in the absence of oxygen to thermally decompose the methane into hydrogen and solid carbon;

a hydrogen pipe connected to the pyrolysis chamber and a fuel gas header, wherein the hydrogen pipe is configured to flow the hydrogen from the pyrolysis chamber to the fuel gas header; and the fuel gas header connected to a power generation plant, wherein the fuel gas header is configured to flow a mixture of the hydrogen and fuel gas comprising at least one hydrocarbon to the power generation plant where the mixture is combusted to generate electrical power, wherein the pyrolysis chamber is electrically connected to the power generation plant, wherein the pyrolysis chamber is configured to receive electrical power from the power generation plant and convert the received electrical power into heat for heating the portion of the flare gas.

9. The system of claim 8, comprising an online heating value sensor disposed on the fuel gas header, wherein the online heating value sensor is configured to measure a heating value of the mixture in the fuel gas header.

10. The system of claim 9, comprising a controller communicatively coupled to the online heating value sensor, wherein the online heating value sensor is configured to transmit the measured heating value of the mixture in the fuel gas header to the controller, wherein the controller is configured to determine whether the measured heating value received from the online heating value sensor is within a specified heating value range.

11. The system of claim 10, comprising a hydrogen flow control valve disposed on the hydrogen pipe, wherein the hydrogen flow control valve is communicatively coupled to the controller, wherein the controller is configured to transmit a hydrogen adjust opening signal to the hydrogen flow control valve to adjust a percent opening of the hydrogen flow control valve in response to determining that the measured heating value of the mixture in the fuel gas header is outside the specified heating value range.

12. The system of claim 11, wherein the specified heating value range is about 900 British thermal units per standard cubic feet (Btu/scf) to about 1,050 Btu/scf.

13. The system of claim 11, comprising a flow sensor disposed on the flare header, wherein the flow sensor is configured to measure a flow rate of the flare gas flowing in the flare header.

14. The system of claim 13, wherein the controller is communicatively coupled to the flow sensor, wherein the flow sensor is configured to transmit the measured flow rate of the flare gas flowing in the flare header to the controller.

15. The system of claim 13, comprising a methane flow control valve disposed on the methane pipe, wherein the methane flow control valve is communicatively coupled to the controller, wherein the controller is configured to transmit a methane adjust opening signal to the methane flow control valve to adjust a percent opening of the methane flow control valve at least based on the measured flow rate of the flare gas flowing in the flare header received from the flow sensor.

16. A method comprising:

combusting a fuel gas comprising at least one hydrocarbon;

generating electrical power in response to combusting the fuel gas;

providing a first portion of the generated electrical power to a gas processing plant, wherein the gas processing plant includes a flare header that routes a flare gas to a flare;

providing a second portion of the generated electrical power to a pyrolysis chamber;

converting the second portion of the generated electrical power to heat within the pyrolysis chamber;

flowing a portion of the flare gas from the gas processing plant to the pyrolysis chamber, wherein the flare gas comprises methane;

heating, with the heat within the pyrolysis chamber, the portion of the flare gas in the absence of oxygen to thermally decompose the methane into hydrogen and solid carbon; and mixing the hydrogen from the pyrolysis chamber with the fuel gas to form a fuel gas mixture prior to combustion of the fuel gas, wherein combusting the fuel gas comprises combusting the fuel mixture.

17. The method of claim 16, comprising measuring a heating value of the fuel gas mixture to determine whether the measured heating value of the fuel gas mixture is within a specified heating value range.

18. The method of claim 17, comprising adjusting an amount of hydrogen being mixed with the fuel gas in response to determining that the measured heating value of the fuel gas mixture is outside the specified heating value range.

19. The method of claim 18, wherein the specified heating value range is about 900 British thermal units per standard cubic feet (Btu/scf) to about 1,050 Btu/scf.

* * * * *